(12) United States Patent
Van Hemelrijck et al.

(10) Patent No.: US 11,623,976 B2
(45) Date of Patent: *Apr. 11, 2023

(54) PROCESS FOR THE PRODUCTION OF A THERMOPLASTIC ELASTOMER AND THE THERMOPLASTIC ELASTOMER

(71) Applicant: DSM IP ASSETS B.V., Heerlen (NL)

(72) Inventors: Ellen Van Hemelrijck, Echt (NL); Wilhelmus Petrus Johannes Appel, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 219 days.

This patent is subject to a terminal disclaimer.

(21) Appl. No.: 17/096,850

(22) Filed: Nov. 12, 2020

(65) Prior Publication Data

US 2021/0061949 A1 Mar. 4, 2021

Related U.S. Application Data

(63) Continuation of application No. 16/312,515, filed as application No. PCT/EP2017/065662 on Jun. 26, 2017, now Pat. No. 10,865,273.

(30) Foreign Application Priority Data

Jun. 27, 2016 (EP) ..................................... 16176401

(51) Int. Cl.
| | | |
|---|---|---|
| *C08G 63/80* | (2006.01) | |
| *B29C 49/00* | (2006.01) | |
| *B29C 49/04* | (2006.01) | |
| *C08G 63/183* | (2006.01) | |
| *C08G 63/64* | (2006.01) | |

(52) U.S. Cl.
CPC .......... *C08G 63/80* (2013.01); *B29C 49/0015* (2013.01); *B29C 49/04* (2013.01); *C08G 63/183* (2013.01); *C08G 63/64* (2013.01)

(58) Field of Classification Search
USPC ........................................ 528/196, 198, 199
See application file for complete search history.

(56) References Cited

U.S. PATENT DOCUMENTS

| | | |
|---|---|---|
| 4,147,738 A | 4/1979 | Borman |
| 7,973,124 B2 | 7/2011 | Maruyama et al. |
| 2009/0203871 A1 | 8/2009 | Maruyama et al. |
| 2012/0128911 A1 | 5/2012 | Akiba |

FOREIGN PATENT DOCUMENTS

| | | |
|---|---|---|
| CN | 101341186 | 1/2009 |
| EP | 1 444 288 | 8/2004 |
| EP | 1 964 871 | 9/2008 |
| JP | 2007-326948 | 12/2007 |
| WO | 2007/072748 | 6/2007 |
| WO | 2015/140105 | 9/2015 |

OTHER PUBLICATIONS

International Search Report and Written Opinion of the ISA for PCT/EP2017/065662, dated Sep. 13, 2017, 13 pages.
Pilati et al., "Formation of poly(butylene terephthalate): Secondary reactions studied by model molecules", *Polymer*, vol. 22, No. 11, Nov. 1, 1981, pp. 1566-1570, 5 pages.
EP Appln. No. 17732452.2, Communication pursuant to Rule 114(2) EPC, dated Dec. 13, 2019.

*Primary Examiner* — Terressa Boykin
(74) *Attorney, Agent, or Firm* — Nixon & Vanderhye P.C.

(57) ABSTRACT

A process for the production of a thermoplastic elastomer containing hard segments (a) of a polyester and soft segments (b) containing repeating units derived from an aliphatic carbonate, in which process a precursor thermoplastic elastomer is subjected to solid state post condensation at a temperature between 140 and 170° C. Also claimed is the thermoplastic elastomer.

18 Claims, No Drawings

PROCESS FOR THE PRODUCTION OF A THERMOPLASTIC ELASTOMER AND THE THERMOPLASTIC ELASTOMER

This application is a continuation of commonly owned U.S. Ser. No. 16/312,515, filed Dec. 21, 2018 (now U.S. Pat. No. 10,865,273) which is the U.S. national phase of International Application No. PCT/EP2017/065662 filed Jun. 26, 2017 which designated the U.S. and claims priority to EP Patent Application No. 16176401.4 filed Jun. 27, 2016, the entire content of each being hereby expressly incorporated by reference.

The invention relates to a process for the production of a thermoplastic elastomer containing hard segments (a) of a polyester and soft segments (b) containing repeating units derived from an aliphatic carbonate. The invention also relates to the thermoplastic elastomer.

Such a process and thermoplastic elastomer are known from EP-A-0846712. The thermoplastic elastomer known from EP-A-0846712 contains hard segments of a polyester and soft segments containing repeating units derived from an aliphatic carbonate, the hard and the soft segments being linked by a urethane group. The thermoplastic elastomer shows good mechanical properties and has superior thermal and hydrolytical stability. Compositions containing the thermoplastic elastomer find therefore application in all kind of fields, inter alia in the field of electrics and electronics, especially as cover for cables, for example cables for connecting devices to computers, such as for example automotive cables for use under the hood, railway cables, heating cables, and industrial cables, e.g. used in robotics, off-shore, etc.

Especially because of the good thermal stability, the thermoplastic elastomer would be very suitable for the production of containers and hoses, i.a containers and hoses for use under the hood of a car, such as for example air ducts. Such containers and hoses are preferably produced by blow molding, more preferably by suction blow molding. A problem however is that the thermoplastic elastomer known from EP-A-0847612 is not suitable for use in a blow molding process, since the visco-elastic properties do not fulfill the demands for that process.

During blow molding in a first step a molten preform, often a tube-like piece of molten plastic called parison, is formed. The preform is then clamped in a mold and blown-up with compressed air against the cool wall of the mold to cool down into the end product. Preferably suction blow molding is used. In that case the parison is in a second step drawn into the mold via vacuum and in a third step the parison is blown with compressed air against the cool wall of the mold. With suction blow molding the amount of waste polymer is reduced. A problem that occurs during the blow molding is that during the preparation of the parison and its handling, the parison sags under its own weight and it is not possible to produce a product out of it any more.

Attempts have been made to alter the visco-elastic properties by solid state post-reaction of a precursor thermoplastic elastomer to obtain the thermoplastic elastomer with higher molecular weight and consequently higher viscosity. Solid state post-reaction, like solid state post-condensation is normally carried out by heating the thermoplastic elastomer to just below its melting point and keeping it at that temperature, until the desired increase in molecular weight has been obtained. A problem that occurs however is that the melting temperature of the precursor thermoplastic elastomer drops during the process of post-condensation, so that it is not suitable any more for use at elevated temperatures, for instance at temperatures under the hood. This is highly disadvantageously, because this is an important area of application of the thermoplastic elastomer, due to the excellent thermal stability of the polymer.

Furthermore the required viscosity was not obtained during the solid state post-reaction.

Object of the present invention is to develop a process for the production of a thermoplastic elastomer containing hard segments (a) of a polyester and soft segments (b) containing repeating units derived from an aliphatic carbonate, which thermoplastic elastomer is suitable for use in a blow molding process, that do not show the problems outlined above.

Surprisingly this object has been obtained if a precursor thermoplastic elastomer is subjected to solid state post-reaction at a temperature between 140 and 170° C.

The hard segments (a) of a polyester contain repeating units formed from at least one aromatic dicarboxylic acid and at least one aliphatic diol. Suitable aromatic dicarboxylic acids include inter alia isophthalic or terephthalic acid, 2,6-naphthalenedicarboxylic acid and 4,4'-diphenyldicarboxylic acid. Also very suitable is a mixture of 4,4'-diphenyldicarboxylic acid and 2,6-naphthalenedicarboxylic acid or a mixture of 4,4'-diphenyldicarboxylic acid and terephthalic acid. The mixing ratio between the two carboxylic acids is preferably chosen between 40:60-60:40 on weight basis.

Suitable aliphatic diols for the hard segment a) are inter alia the alkylene glycols. The number of C atoms in the alkylene radical is preferably 2-6. Ethylene glycol, propylene glycol and butylene glycol are preferred. 1,4-Butylene glycol is most preferred.

Most preferably the hard segment (a) of a polyester contains as repeating units butylene terephthalate.

The soft segment (b) is made up of repeating units from at least one alkylene carbonate.

Preferably as alkylene carbonate repeating unit is represented by the formula:

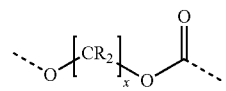

(form. 1)

where R=H and/or alkyl.
X=2-20.

Preferably, R is H or alkyl.

More preferred R=H and x=6 and the alkylene carbonate is therefore hexamethylene carbonate.

The soft segment b) may, next to the units from at least one aliphatic carbonate, contain repeating units derived from an aliphatic diol, and an aliphatic dicarboxylic acid or repeating units derived from a lactone.

The thermoplastic elastomer may next to soft segments b) also contain soft segments c) derived from an aliphatic diol and an aliphatic dicarboxylic acid. The aliphatic diol used in b) and c) is preferably an alkylene diol containing 2-20 C atoms, more preferably 3-15 C atoms in the chain. The aliphatic dicarboxylic acid used in b) and c) is preferably an alkylene dicarboxylic acid containing 2-20 C atoms, preferably 4-15 C atoms in the chain. Preferably c) contains butylene adipate as repeating unit.

The thermoplastic elastomer may next to soft segments b) also contain soft segments d) derived from a lactone. The lactone used in b) and d) is preferably polycaprolactone.

The contents of hard segments and soft segments may vary within wide limits and are primary determined by the desired mechanical properties. Thermoplastic elastomers having a high content of hard segments have a greater rigidity and higher melting point. On the other hand thermoplastic elastomers having a low content of hard segments are much more flexible and have a lower melting point. The weight ratio between hard segments and soft segments in the thermoplastic elastomer may vary between 20:80 and 90:10, preferably between 30:70 and 80:20.

The hard segments of the polyester and the soft segments may suitably be bonded via ester bonds to form copolyester units and said copolyester units being joined to one another by (e) a urethane group having the formula:

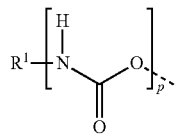

Where $R^1$=an alkyl, aryl or aralkyl group and p=2 or 3.

The content of the urethane group (e) is usually between 2 and 7 wt. % based on the total of the thermoplastic elastomer.

Usual diisocyanates used to form the urethane group are inter alia paratoluene diisocyanate, diphenylmethane diisocyanate (MDI), xylene diisocyanate, hexamethylene diisocyanate and isophorone diisocyanate.

Preparation of the precursor thermoplastic elastomer is for instance described in EP-A-0846712 and a suitable preparation method may contain the steps of:
1. reacting polyester hard segment a) with an aromatic dicarboxylic acid, an aliphatic polycarbonate diol segment b) and if desired an aliphatic polyester segment c) and/or a polylactone segment d) with one another in the presence of a catalyst at elevated temperature for a limited period of time, while removing any volatile reaction products formed.
2. Deactivating the catalyst at least partially.
3. Adding a difunctional and/or a multifunctional isocyanate, such as a trifunctional isocyanate, to block the copolyester under 1 and continuing the reaction.

Prior to the solid state post-reaction the precursor thermoplastic elastomer may be subjected to a compounding step. Additives mixed with the precursor thermoplastic elastomer may be antioxidants, dyes or pigments, UV absorbers, hydrolytic stabilizers, anti-static agents, fillers, lubricants etc. Between 0.1 and 5 parts by weight of the additives at 100 parts by weight of the precursor thermoplastic elastomer may be added. The compounding step may be carried out by dry blending followed by extrusion. It is also possible that additives are added during the solid state post-reaction to stick to the particles of the thermoplastic polymer or to be absorbed by the particles.

The thermoplastic elastomer is, preferably after the compounding step, subjected to a solid state post-reaction at a temperature between 140° C. and 170° C., preferably above 150° C. and preferably below 165° C., more preferably below 160° C. The solid state post-reaction may be carried out between 4 and 32 hours, preferably between 12 and 24 hours. Normally the post-reaction is carried out on particles of the thermoplastic polymer, suitably on pellets.

The post-reaction of the polymer composition according to the present invention may be carried out by any mode and in any apparatus suitable for that purpose. The process can suitably be carried out, for example, as a batch process (e.g. in a tumble dryer) or as a continuous process (e.g. in a moving bed reactor).

The solid state post-reaction is preferably performed until the thermoplastic elastomer has a melt flow index measured at 230° C. under a load of 10 kg (MFI 230° C./10 kg), according to ISO1133 (2011) of at most 40 g/10 min, preferably at most 30 g/10 min, more preferably at most 25 g/10 min.

Preferably, the polymer composition contains less than 0.3 wt % of a reactive additive. More preferably, the polymer composition does not contain a reactive additive. Reactive additives are known per se, and refer to additives which react with the thermoplastic elastomer during melt-processing, such as for example during blow molding. Reactive additives are for example glycidyl compounds such as glycidyl group containing styrenic polymers, trimethyol propane triglycidyl ether, polyglycidyl ether of castor oil, 1,3,5-triglycidyl isocyanurate, tris(4-hydroxyphenyl)methane triglycidyl ether, N,N-diglycidyl-4-glycidyloxyaniline, 4,4'-Methylenebis(N,N-diglycidylaniline), poly[(o-cresyl glycidyl ether)-co-formaldehyde]. Preferably, the polymer composition contains less than 0.3 wt % glycidiyl compound. This has the advantage that upon processing, the viscosity remains more stable.

The invention also relates to a thermoplastic elastomer containing hard segments (a) of a polyester and soft segments (b) containing repeating units derived from an aliphatic carbonate and to the thermoplastic elastomer having a melt flow index measured at 230° C. under a load of 10 kg (MFI 230° C./10 kg), according to ISO1133 (2011) of at most 40 g/10 min, preferably at most 30 g/10 min, more preferably at most 25 g/10 min. Preferably the thermoplastic elastomer according to the invention has a melting temperature measured with DSC, according to ISO 11357-1:1997 under air atmosphere (purge 50 ml/min) using a heating and cooling rate of 20 K/min of at least 180° C., preferably at least 190° C., more preferably at least 200° C., most preferably at least 205° C.

Preferably, the thermoplastic elastomer according to the invention has —OH end groups, which has the advantage that the end groups do not have to be modified, which allows for a more simple process for preparation.

The invention also relates to a process for blow molding a polymer composition consisting of or containing the thermoplastic elastomer according to the invention.

Blow molding, also known as blow forming, is a manufacturing process by which in general hollow thermoplastic articles are formed. In principle the process has two phases. First, a pre-form (or parison) of molten thermoplastic composition is formed, often in a tubular shape. Second the hot pre-form is expanded and pressed against a mold cavity. The temperature of the mold is low enough, so that the polymer composition will solidify. Once the plastic has cooled and solidified the mold opens up and the part is ejected.

The hot preform is generally expanded by a compressed gas, usually air. Preferably the process according to the invention is a suction blow molding process. In the suction blow molding process the preform is, after being placed in the mold, stretched by applying a vacuum is the mold in a first step and expanded against the wall of the mold in a second step by applying compressed air in the preform.

Good examples of shaped objects that may be formed with the process of the present invention further include air ducts, corrugated tubes, that may be used for the production of jounce bumpers, covers for constant velocity joints in car industry etc.

EXAMPLES

Materials Used:

Arnitel CM551, a copolymer containing polybutyleneterephtalate hard segments and polyhexamethylenecarbonate soft segments, having an MFI (230° C., 10 kg) of 60 g/10 min and a melting temperature of 205° C.

Arnitel CM622, a copolymer containing polybutyleneterephtalate hard segments and polyhexamethylenecarbonate soft segments, having an MFI (230° C., 10 kg) of 65 g/10 min and a melting temperature of 208° C.

Test Methods:

The melting temperature was measured with DSC, according to ISO 11357-1:1997 under air atmosphere (purge 50 ml/min) using a heating and cooling rate of 20 K/min.

The melt flow index (MFI) was measured according to ISO 1133 (2011).

Comparative Experiments A, B, C, D and E and Examples I and II 25 grams of Arnitel CM622 pellets were loaded in a tubular reactor of 100 ml and heated to various temperatures under a continuous nitrogen flow of 500 grams/hour during 20 hours. The MFI and the melting temperature of the resulting material were measured. The results are given in table 1.

TABLE 1

| Comp. Exp./ Example | Reaction Temperature (° C.) | MFI (g/10 min) | Melting Temperature (° C.) |
| --- | --- | --- | --- |
| A | 80 | 63 | 205 |
| B | 110 | 55 | 204 |
| C | 130 | 47 | 203 |
| I | 150 | 27 | 203 |
| II | 170 | 15 | 199 |
| D | 180 | 42 | 190 |
| E | 190 | 65 | 180 |

Comparative Experiment F and Example III 25 grams of Arnitel CM551 pellets were loaded in a tubular reactor of 100 ml and heated to various temperatures under a continuous nitrogen flow of 500 grams/hour during 16 hours. The MFI and the melting temperature of the resulting material were measured. The results are given in table 2.

TABLE 2

| Comp. Exp./ Example | Reaction Temperature (° C.) | MFI (g/10 min) | Melting Temperature (° C.) |
| --- | --- | --- | --- |
| III | 150 | 16 | 199 |
| F | 185 | >200 | Amorphous |

At low reaction temperatures (comparative experiments A, B and C) no sufficient decrease in MFI is obtained, although no significant decrease in melting temperature is observed.

At high reaction temperatures (comparative experiments D, E and F) even an increase in MFI is observed, and a steep decrease in melting temperature is observed.

At temperatures between 140° C. and 170° C. both the significant decrease in MFI is obtained as required, while maintaining the melting temperature at an acceptable level.

The invention claimed is:

1. A process for the production of a thermoplastic elastomer comprising:
   (a) hard segments of a polyester, and
   (b) soft segments comprising repeating units derived from an aliphatic carbonate, wherein
   the process comprises subjecting a precursor of the thermoplastic elastomer to solid state post-reaction at a temperature between 140 and 170° C.

2. The process according to claim 1, wherein the precursor thermoplastic elastomer is subjected to solid state post-reaction at a temperature below 165° C.

3. The process according to claim 1, wherein the hard segments (a) of a polyester comprise repeating units derived from butylene terephthalate.

4. The process according to claim 1, wherein soft segments (b) comprise alkylene carbonate repeating units represented by Formula I:

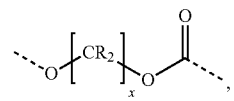

Formula I where R=H and/or alkyl; and
X=2-20.

5. The process according to claim 1, wherein the hard segments (a) and the soft segments (b) are bonded via ester bonds forming copolyester units and the copolyester units are joined by a urethane group having the formula:

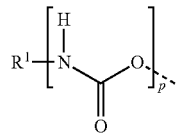

where $R^1$=an alkyl, aryl or aralkyl group and p=2 or 3.

6. A thermoplastic elastomer comprising:
   (a) hard segments of a polyester, and
   (b) soft segments comprising repeating units derived from an aliphatic carbonate, wherein
   the thermoplastic elastomer has a ratio of the hard segments (a) to the soft segments (b) of between 20:80 and 90:10, and wherein
   the thermoplastic elastomer has a melt flow index (MFI) measured at 230° C. under a load of 10 kg (MFI 230° C./10 kg), according to ISO1133 (2011) of at most 40 g/10 min.

7. The thermoplastic elastomer according to claim 6, wherein the MFI of the thermoplastic elastomer is at most 30 g/10 min.

8. The thermoplastic elastomer according to claim 6, wherein the thermoplastic elastomer has a melting temperature, measured with DSC according to ISO 11357-1:1997 under air atmosphere (purge 50 ml/min) using a heating and cooling rate of 20 K/min, which is at least 180° C.

9. The thermoplastic elastomer according to claim 8, wherein the melting temperature of the thermoplastic elastomer is at least 200° C.

10. The thermoplastic elastomer according to claim 6, wherein the hard segments (a) of a polyester comprise repeating units derived from butylene terephthalate.

11. The thermoplastic elastomer according to claim 6, wherein the soft segments (b) comprise alkylene carbonate repeating units represented by Formula I:

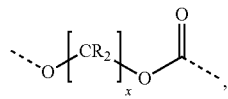

Formula I where R═H and/or alkyl; and
X=2-20.

12. The thermoplastic elastomer according to claim 6, wherein the ratio of the hard segments (a) to the soft segments (b) is between 30:70 and 80:20.

13. The thermoplastic elastomer according to claim 7, wherein the MFI of the thermoplastic elastomer is 15 g/10 min to at most 30 g/10 min.

14. A process for forming a blow-molded article which comprises subjecting the thermoplastic elastomer according to claim 6 to blow molding conditions to obtain a blow-molded article thereof.

15. The process according to claim 14, wherein the process is suction blow molding.

16. A blow-molded article formed by the process according to claim 14.

17. A shaped object comprising the thermoplastic elastomer according to claim 6.

18. The shaped object according to claim 17, wherein the shaped object is an air duct, a corrugated tube for the production of jounce bumpers, a cover for constant velocity joint.

* * * * *